Sept. 11, 1928.

D. M. BLISS

ALTERNATING CURRENT COMMUTATOR MOTOR

Filed June 23, 1927

1,683,601

Inventor:
Donald M. Bliss
by Albert Scheible
Attorney

Patented Sept. 11, 1928.

1,683,601

UNITED STATES PATENT OFFICE.

DONALD M. BLISS, OF CHICAGO, ILLINOIS, ASSIGNOR TO BODINE ELECTRIC COMPANY, OF CHICAGO, ILLINOIS, A CORPORATION OF ILLINOIS.

ALTERNATING-CURRENT COMMUTATOR MOTOR.

Application filed June 23, 1927. Serial No. 200,791.

This invention relates to single-phase alternating current motors, and more particularly to motors of the repulsion type employing a commutator and short-circuited brushes, and aims to provide a simple motor of this type which will have a high starting torque and a relatively high power factor, which will operate at an approximately maintained speed without requiring compensating arrangements or any shifting of brushes; and which will have good operating characteristics, such as sparklessness and quiet running and good commutation at all speeds.

Furthermore, my invention aims to provide an alternating current repulsion motor involving such comparatively slight changes from a direct current motor that the same field and armature parts can be employed for both, thereby reducing the number of parts which need to be carried in stock by the manufacturer of both direct and alternating current types of motors. So also, my invention aims to provide a repulsion type of alternating current motor in which the starting current will not appreciably exceed the current required at full load, thereby overcoming the objections raised by electric light companies to alternating current motors which requires starting currents far in excess of their full load requirement.

Figure 1:
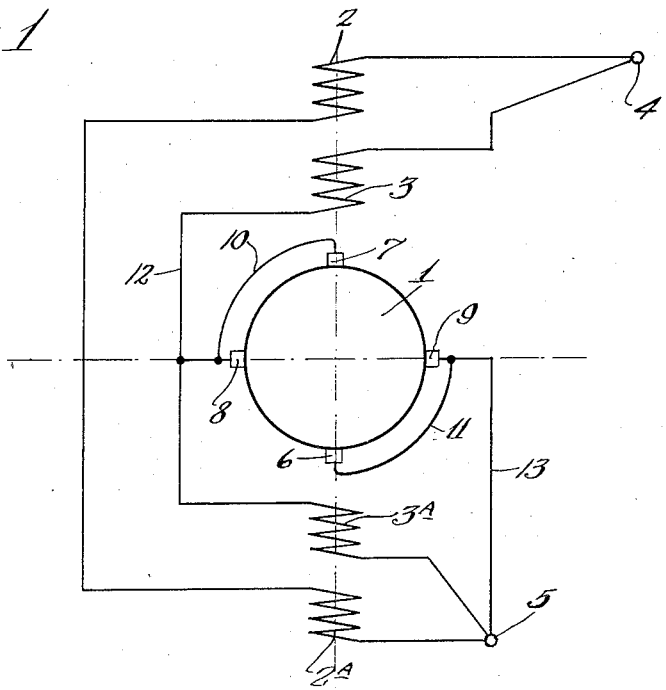

Still further and also more detailed objects will appear from the following specification and from the accompanying drawings, in which Fig. 1 is a diagram of a two-pole motor embodying my invention.

Figure 2:
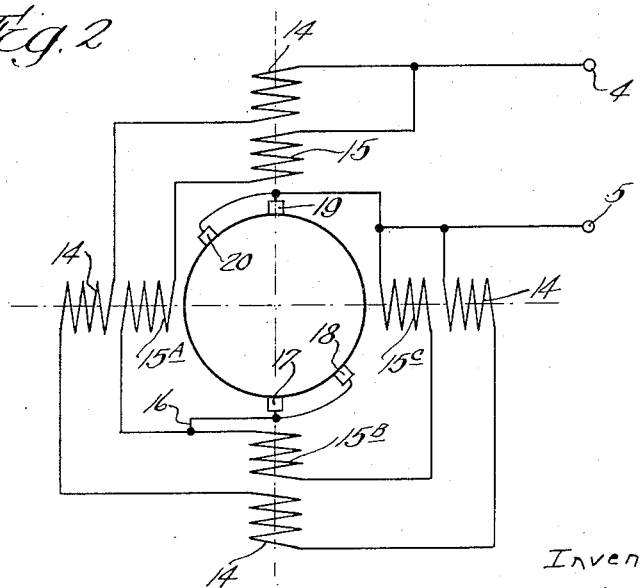

Fig. 2 is a diagram of a four-pole embodiment.

Referring first to the two-pole embodiment of Fig. 1, this includes a drum-wound armature 1 of a commutator type disposed between two opposed field windings. Each of these field windings comprises a shunt coil (2, 2ᴬ) and a series coil (3, 3ᴬ) of the same polarity. The two field coils for each pole are preferably equal in turns and wound conjointly by using the two strands of a twin wire, and the series coils 2 and 2ᴬ are connected in series with each other across the supply-circuit terminals 4 and 5.

The other oppositely disposed field coils 3 and 3ᴬ are also connected in series with each other and in shunt with the aforesaid series-connected pair of field coils across the supply-circuit terminals.

Engaging the commutator are two fixedly positioned pairs of interconnected brushes, each having one brush (6, 7) associated with the part of the armature winding which alines with the common axis of the four field coils. The other two brushes (8, 9) respectively make connections to the armature winding along an axis at right angles to this field coil axis, and the brush-interconnections (10, 11) are diametrically opposite each other, so that these interconnected brushes short-circuit two diametrically opposite armature quarters which extend rotationally in the same direction from the axis of the opposed field poles.

One of the interconnected pairs of brushes (7, 8) is connected to the wire 12 connecting the field coils 3 and 3ᴬ, desirably at the middle point of this connecting wire. The other interconnected brushes 6 and 9 are connected to one of the wire terminals, as by a wire 13.

Thus connected, the armature is in series with the field coil 3, but in parallel with the opposite field coil 3ᴬ which is in series with the coil 3, while the coils 2 and 2ᴬ are purely in series. Consequently, I secure a combination of series and shunt characteristics with exceedingly simple windings.

By disposing the brushes respectively on the axis of the field coils and at right angles to this axis, I secure a strong starting torque, namely a torque fully equaling the torque of the motor at maximum load, together with good commutation. The action of the field coil 3 (which is in series with the armature) augments the action of the merely series-connected coils 2 and 2ᴬ by decidedly improving the power factor, while the shunting of the armature by the coil 3ᴬ steadies the speed. As the result, I have found—for example—that a one-sixth horsepower motor constructed as above described showed a power factor ranging from 87 to 94 percent, with a speed variation from about 3500 R. P. M. at no load to 2500 at full load, thus giving both a high power factor and a speed regulation equal to that of direct current motors of the same general type and size.

Furthermore, the change from a direct current motor to my alternating current motor only involves the addition of two brushes, the providing of two equivalent field windings for each field pole, and the quite simple connections. No shifting of any brushes or other provisions are required either for starting my motor or to secure a maintained speed adequate for commercial motors, and by disposing the brushes along the said two axes I secure good commutation at all loads, as the number of turns of the armature winding can easily be proportioned to those on the field coils to afford an effective division of the current.

Moveover, my motor can also be constructed with more than two field poles, thus securing the same advantages for larger sizes. Thus, Fig. 2 shows a four-pole embodiment of my invention, in which coils 14 for each pole are connected in series across the supply-circuit terminals 4 and 5. The other four field coils (15, 15$^A$, 15$^B$ and 15$^C$) are also connected in series across the same terminals, and a connection 16 is made from the mid-point of this series of field coils to the interconnected brushes 17 and 18. One of these is on one of the field axes, while the other is displaced rotationally by half the angle of divergence between the consecutive field poles, or 45 degrees. The diametrically opposite pair of brushes 19 and 20 (which likewise shortcircuit 45 degrees of the armature) are connected to one of the supply-circuit terminals.

With this embodiment, the plain series-connecting of the field coils 14 co-operates with the definite positioning of the interconnected brushes for affording a strong starting torque and a considerable power-factor, and the power-factor is improved by the action of the series-connected coils 15 and 15$^A$. At the same time, the shunting of the armature by the coils 15$^B$ and 15$^C$ gives a desirable fair speed regulation.

I claim as my invention:

1. In a two-pole commutator type alternating current motor, two circuits spanning the current supply terminals, each circuit including in series with each other a coil for each pole; two commutating means for respectively short-circuiting armature portions extending for ninety degrees rotationally in the same direction from the axis of the said poles, a connection from one of the commutating means to one of the supply terminals, and a connection from the other commutating means to the one of the said circuits intermediate of the coils of that circuit.

2. In a commutator type alternating current motor, two circuits spanning the current-supply terminals, each circuit including in series with each other a field coil for each pole of the motor; two commutating means for respectively short-circuiting armature portions extending rotationally in the same direction respectively from the axes of two field coils of opposite polarity and for half the distance to the axis of the next consecutive field coil; a connection from one of the commutating means to one of the supply terminals, and a connection from the other commutating means to the midpoint of one of the said circuits.

3. A single phase alternating current motor comprising a pair of opposed field coils connected in series across the supply-circuit terminals, a second pair of field coils superposed respectively on the aforesaid coils and also connected in series across the terminals, a drum wound armature, means for continuously short-circuiting quadrants of the armature winding extending in the same direction rotationally from the common axis of the said coils, and connections to the short-circuiting means shunting one only of the field coils.

4. A single phase alternating-current repulsion motor comprising a drum wound armature, two equivalent and coaxial pairs of field coils diametric of the armature at opposite sides thereof, two short-circuiting means associated with diametrically opposite portions of the armature and effectively extending in the same direction rotationally of the armature, and means respectively connecting the two short-circuiting means with the terminals of a single field coil.

5. A single phase repulsion motor comprising an armature, two groups of relatively superposed and equivalent field windings in shunt with each other across the current terminals of the motor, each group comprising coils for all field poles, and means for shunting one-half of the coils of one group through all of the armature turns extending rotationally from the axis of one coil of that group half-way to the axis of the coil of the same group rotationally consecutive thereto.

Signed at Chicago, Illinois, June 18th, 1927.

DONALD M. BLISS.